(12) United States Patent
Ciubotariu

(10) Patent No.: US 11,989,161 B2
(45) Date of Patent: *May 21, 2024

(54) GENERATING READABLE, COMPRESSED EVENT TRACE LOGS FROM RAW EVENT TRACE LOGS

(71) Applicant: Amazon Technologies, Inc., Seattle, WA (US)

(72) Inventor: Mircea Ciubotariu, Culver City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,518

(22) Filed: Jul. 1, 2022

(65) Prior Publication Data

US 2022/0335013 A1    Oct. 20, 2022

Related U.S. Application Data

(63) Continuation of application No. 16/451,799, filed on Jun. 25, 2019, now Pat. No. 11,379,421.

(51) Int. Cl.
  *G06F 16/174* (2019.01)
  *G06F 16/17* (2019.01)

(52) U.S. Cl.
  CPC ...... *G06F 16/1744* (2019.01); *G06F 16/1734* (2019.01)

(58) Field of Classification Search
  CPC ... G06F 16/1744; G06F 3/0641; G06F 16/215
  See application file for complete search history.

(56) References Cited

U.S. PATENT DOCUMENTS

| | | |
|---|---|---|
| 2004/0255160 A1 | 12/2004 | Stamos et al. |
| 2016/0092552 A1 | 3/2016 | Morfonios et al. |
| 2020/0250307 A1 | 8/2020 | Pendyala et al. |

OTHER PUBLICATIONS

Advisory Action, U.S. Appl. No. 16/451,799, dated Oct. 22, 2021, 3 pages.
Final Office Action, U.S. Appl. No. 16/451,799, dated Aug. 5, 2021, 11 pages.
Non-Final Office Action, U.S. Appl. No. 16/451,799, dated Feb. 2, 2021, 11 pages.

(Continued)

*Primary Examiner* — Hau H Hoang
(74) *Attorney, Agent, or Firm* — Nicholson De Vos Webster & Elliott LLP

(57) ABSTRACT

Method and apparatus for compressing raw event logs into smaller readable formats are described. An example includes receiving an uncompressed log file including traces of events executed on a computing system. In the uncompressed log file, a number of consecutive events are identified referencing an action performed with different parameters, and the uncompressed log file is modified by replacing the identified consecutive events with a record indicating that an event has been repeated the number of times. In the modified log file, repeated sequences of events are identified, a compressed log file is generated by replacing, in the modified log file, repeated sequences of events with a record referencing an initial repetition of events and a difference between parameters included in the initial repetition of events and a respective repeated sequence, and the generated compressed log file is output.

20 Claims, 7 Drawing Sheets

(56) References Cited

OTHER PUBLICATIONS

Notice of Allowance, U.S. Appl. No. 16/451,799, dated Mar. 9, 2022, 8 pages.
Notice of Allowance, U.S. Appl. No. 16/451,799, dated Mar. 25, 2022, 5 pages.

UNCOMPRESSED CONSECUTIVE EVENT SEQUENCE — 410

```
2905 1545945106.253058 [0804e28e] write(1, "b", 1) = 1 <0.000045>
2905 1545945106.253120 [0804e28e] write(1, "u", 1) = 1 <0.000023>
2905 1545945106.253157 [0804e28e] write(1, "f", 1) = 1 <0.000019>
2905 1545945106.253189 [0804e28e] write(1, ":", 1) = 1 <0.000018>
2905 1545945106.253220 [0804e28e] write(1, " ", 1) = 1 <0.000023>
2905 1545945106.253257 [0804e28e] write(1, "B", 1) = 1 <0.000019>
2905 1545945106.253289 [0804e28e] write(1, "U", 1) = 1 <0.000019>
2905 1545945106.253325 [0804e28e] write(1, "I", 1) = 1 <0.000019>
2905 1545945106.253357 [0804e28e] write(1, "L", 1) = 1 <0.000018>
2905 1545945106.253403 [0804e28e] write(1, "D", 1) = 1 <0.000025>
2905 1545945106.253454 [0804e28e] write(1, " ", 1) = 1 <0.000032>
2905 1545945106.253503 [0804e28e] write(1, "G", 1) = 1 <0.000033>
2905 1545945106.253551 [0804e28e] write(1, "A", 1) = 1 <0.000039>
2905 1545945106.253606 [0804e28e] write(1, "Y", 1) = 1 <0.000021>
2905 1545945106.253663 [0804e28e] write(1, "G", 1) = 1 <0.000045>
2905 1545945106.253726 [0804e28e] write(1, "F", 1) = 1 <0.000021>
2905 1545945106.253771 [0804e28e] write(1, "T", 1) = 1 <0.000043>
2905 1545945106.253830 [0804e28e] write(1, "\n", 1) = 1 <0.000021>
2905 1545945106.253882 [0804e28e] write(1, "\n", 1) = 1 <0.000035>
```

SINGLE EVENT ENTRY — 420

```
2905 1545945106.253058 0804e28e 0.000518
_rep_write(4[1, "], 19[17*1[buf: BUILD GAYGFT]2[\n]2[\ n]], 4[", 1]) = 1
```

*Fig. 4*

REPEATED EVENT SEQUENCE — 610

1545945106.253058 0804e28e 0.000518 _rep_write(4[1, ''], 19[17*1 [buf: BUILD GAYGFT]2[\n]2[\n]], 4['', 1]) = 1
1545945106.253943 08051d51 0.000021 send(3, "BUILD GAYGFT\n", 13, MSG_NOSIGNAL) = 13
1545945106.253983 0804e18b 25.827536 select(4, [3], NULL, [3], {30, 0}) = 1 (left {4, 172486})
1545945132.081586 08051d51 0.009259 _rep_recv(4[3, ''], 5[4*1 [PING]2[\n]], 7['', 1, 0]) = 1

1545945132.090924 0804e28e 0.000518 _rep_write(4[1, ''], 19[17*1 [buf: BUILD GAYGFT]2[\n]2[\n]], 4['', 1]) = 1
1545945132.091588 08051d51 0.000014 send(3, "PONG\n", 5, MSG_NOSIGNAL) = 5
1545945132.091618 0804e18b 30.030122 select(4, [3], NULL, [3], {30, 0}) = 0

COMPRESSED SEQUENCE — 620

1545945106.253058 0804e28e 0.000518 _rep_write(4[1, ''], 19[17*1 [buf: BUILD GAYGFT]2[\n]2[\n]], 4['', 1]) = 1

1545945106.253943 08051d51 0.000021 send(3, "BUILD GAYGFT\n", 13, MSG_NOSIGNAL) = 13

1545945106.253983 0804e18b 25.827536 select(4, [3], NULL, [3], {30, 0}) = 1 (left {4, 172486})

1545945132.081586 08051d51 0.009259 _rep_recv(4[3, ''], 5[4*1[PING] 2[\n]], 7['', 1, 0]) = 1

1545945132.090924 0804e28e 30.030952 _sub_1545945106.253058 (4, 3, _rep_write(4[1, ''], 11[9*1[buf: PONG]2[\n]2[\n]], 4['', 1]), send(3, "PONG\n", 5, MSG_NOSIGNAL), ) = ?

*Fig. 6*

GENERATING READABLE, COMPRESSED EVENT TRACE LOGS FROM RAW EVENT TRACE LOGS

CROSS-REFERENCE TO RELATED APPLICATIONS

This application is a continuation of co-pending U.S. patent application Ser. No. 16/451,799, filed Jun. 25, 2019. The aforementioned related patent application is herein incorporated by reference in its entirety.

BACKGROUND

The present invention relates to event logs in computer systems that record activity within computer systems, and more specifically, to compressing event logs to reduce the size of an event log and improve the readability of these event logs for future analyses of events recorded on computer systems.

BRIEF DESCRIPTION OF DRAWINGS

FIG. 4 illustrates an example compression of consecutive events referencing a same action in a computing environment into a single entry corresponding to the consecutive events, according to one embodiment.

FIG. 6 illustrates replacing records of a repeated sequence of events with a substitute record, according to one embodiment.

DETAILED DESCRIPTION

Embodiments described herein describe techniques for compressing event logs into space-efficient and readable files by replacing multiple event traces with single entries that accurately describe the event traces that these single entries replace. Generally, raw, uncompressed event logs may record information recorded about activity performed within a computing system. The records may include live traces of system calls or other events. These records may be used to debug applications, to perform security assessments on computing environments by extracting or identifying events that correspond to malicious behavior, to perform threat analyses based on network activity recorded in the event logs (e.g., communications with endpoint systems identified by IP addresses in the event logs and using communications protocols identified in the event logs), and the like.

Raw event logs may include a large number of events. Because of the size of these raw event logs, these raw event logs may be inefficient to store and may be difficult to process and query effectively in a database. While file compression techniques may be used to reduce the size of a raw event log, these techniques generally operate on individual bits or blocks of bits in a file. Thus, in order to analyze an event log that has been compressed using file compression techniques, the event log may need to be decompressed. Further, while file compression may result in reduced storage requirements for event log data, file compression may not change the data stored within an event log. Thus, the number of entries in an event log may remain the same before and after compression, which may make it difficult to analyze and query for information in an event log.

Embodiments described herein compress event logs into space-efficient and easily searchable files by replacing repeated event traces with single entries, reducing a number of entries included in an event log and thus compressing the size of the event log to be stored in a log repository. Further, by replacing sequences of repeated event traces with single entries, event logs may be made more comprehensible and searchable, as events may be concatenated into individual records identifying the entirety of a set of events performed in a computing environment. Still further, a repeated sequence of events may be replaced with information identifying a similar sequence of events and differences between the repeated sequence of events and the similar sequence of events, which may further compress the size of the event log to be stored in a log repository.

Figure 1:
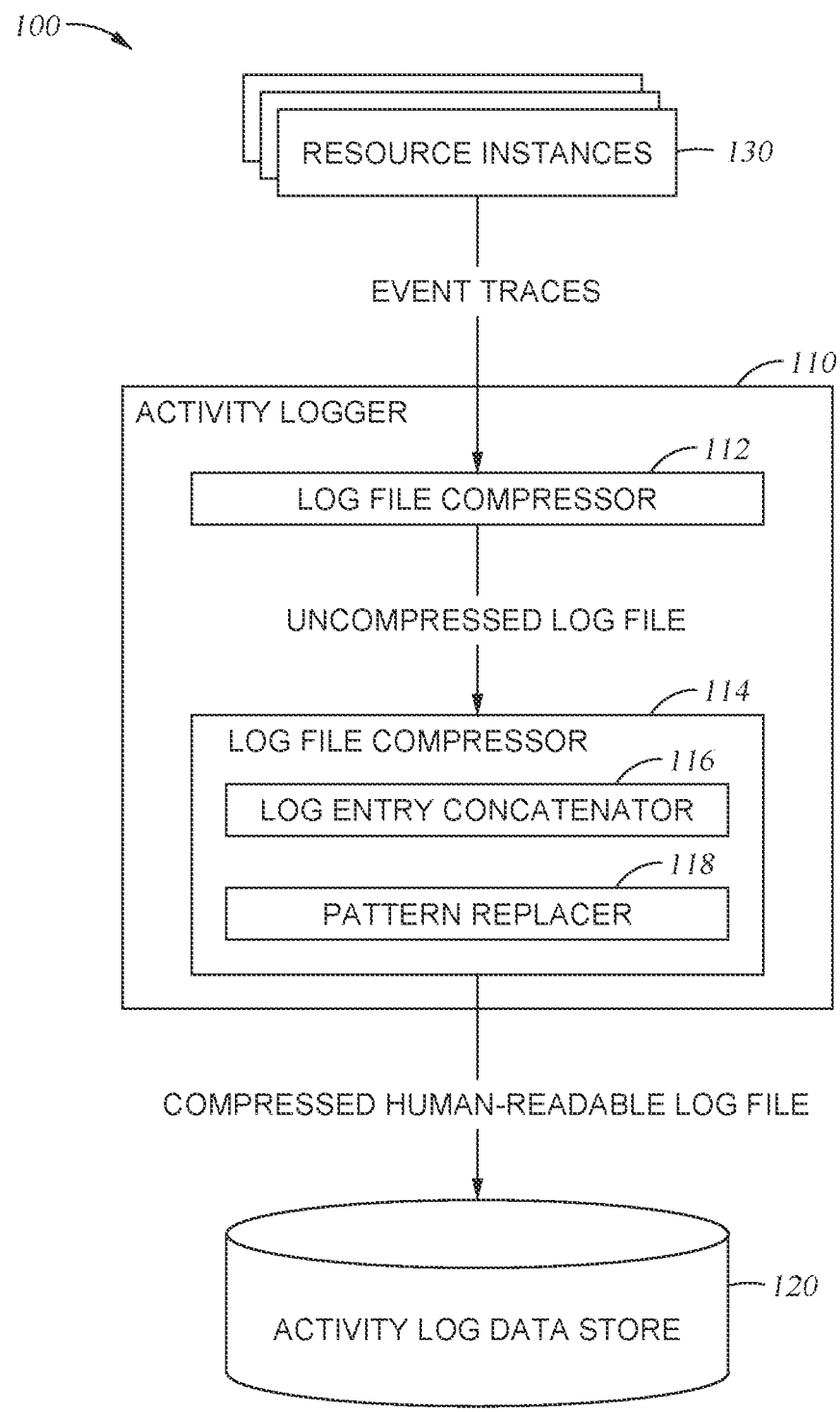
FIG. 1 illustrates a computing environment in which event logs are generated by monitoring events on resource instances in the computing environment and compressed to reduce the size and improve readability of the event logs, according to one embodiment.

FIG. 1 illustrates a computing environment 100 in which raw event log data is captured from resource instances in a computing environment and compressed into a log file that is smaller than a raw event log file resulting from saving the raw event log data to a file and has improved comprehensibility and searchability than the raw event log file, according to an embodiment. As illustrated, computing environment 100 includes an activity logger 110, an activity log data store 120, and one or more resource instances 130.

Activity logger 110 is illustrated to be representative of any computing device that may collect event information, such as system calls or other event traces, from one or more resource instances 130 executing in a computing environment and generate a compressed event log from the collected event information. While activity logger 110 is illustrated separately from resource instances 130, it should be recognized that activity logger may execute on a resource instance 130 within computing environment 100 to generate compressed event logs for the resource instance 130 (e.g., local event logs) or a plurality of resource instances within computing environment 100.

In operation, activity logger 110 captures or otherwise obtains event traces from one or more resource instance 100 and generates a raw log file including the captured event traces. The raw log file may be, for example, a plain text file in which each event in the log file is delimited by a predefined character or set of characters (e.g., a tab, carriage return, carriage return/line feed, etc.). Activity logger 110 may be configured to generate uncompressed log files and output a generated uncompressed log file to log file compressor 114 periodically for compression. For example, activity logger 110 may capture event traces from one or more resource instances and generate an uncompressed log file for a number of hours of operation within computing environment 100. In another example, activity logger 110 may be activated on-demand to capture event traces for analysis until a user terminates capture operations at activity logger 110. This on-demand generation of log files may be performed, for example, when a user is debugging applications or processes executing on one or more resource instances 130 (e.g., to identify a source of a problem in a production version of an application executing on a resource instance 130 or to test a development version of the application prior to deploying the application to a production environment) or attempting to identify security threats in computing environment 100. In some embodiments, activity logger 110 may be configured to capture event traces from specified computing instances and for specified processes executing on these computing instances. In other embodiments, activity logger 110 may be configured to capture event traces on a global basis for any resource instance executing within computing environment 100.

After log file generator 112 generates an uncompressed log file including unprocessed event traces captured from resource instances 130 executing in computing environment 100, log file generator 112 outputs the generated uncompressed log file to log file compressor 114 for processing. As discussed in further detail below, log file compressor 114 may read the uncompressed log file on an entry-by-entry basis to identify event traces in the uncompressed log file that can be compressed into a reduced number of records in a compressed version of the log file. Compression of event traces into a reduced number of records may include combining a plurality of event traces referencing a same event into a single entry and substituting repeated sequences of event traces with a reference to an initial instance of the sequence of event traces.

To compress an uncompressed log file, the uncompressed log file may be initially compressed by log entry concatenator 116. Log entry concatenator 116 may parse through an uncompressed log file on an entry-by-entry basis to identify sequences of consecutive event traces referencing the same action performed on a resource instance 130 on different data. For example, these sequences of consecutive event traces may include sequences of writing characters to a bitstream or a file, reading characters from a bitstream or a file, or other events that may appear in consecutive event traces captured from a resource instance. To identify sequences of consecutive event traces, log entry concatenator 116 can use information about the general format of event traces included in an uncompressed log file to identify the location at which a system call or function call is located in an event trace. For example, event traces may be generated as a space delimited sequence of a thread identifier, timestamp, process identifier, function call, and execution time. Further, each system call or function call may have a predefined format, where the name of the system call or function call precedes an initial special character (e.g., the "(" character). Based on the format defined for event traces captured from resource instances 130, log entry concatenator 116 can extract the name of the system call from a first event trace in the uncompressed log file and compare the extracted name of the system call from the first event trace to a name of a system call in a subsequent event trace. If the names of the system calls in the first and subsequent event traces are a mismatch, log entry concatenator 116 can determine that the event traces invoke distinct system calls and may not be combined into a single entry.

If, however, log entry concatenator 116 determines that the system calls in the first and subsequent event traces match, log entry concatenator 116 can record the location of the first entry in the uncompressed log file (e.g., a line number corresponding to the location of the first entry in the uncompressed log file) and can examine additional event traces in the uncompressed log file to identify the last event trace in a series of consecutive event traces referencing the system call. After log entry concatenator 116 identifies the last entry in the series of consecutive event traces, log entry concatenator 116 can generate a single entry to replace the series of consecutive event traces. The single entry may include the timestamp of the first event trace in the series of consecutive event traces, a total execution time, and concatenated parameters generated from the series of consecutive event traces. The total execution time may be calculated as a summation of execution times associated with each event trace in the series of consecutive event traces. The concatenated parameters may be generated by analyzing each parameter in the system call. Log entry concatenator 116 can identify sequences of characters in each system call that are identical across each event trace in the series of consecutive event traces and write these identical sequences as a string identifying a number of characters replicated across the consecutive event traces, a delimiter, and the replicated characters. When characters differ across system calls, log entry concatenator 116 can generate a string identifying the number of event traces in the series of event traces and each character or parameter included in the event traces.

For example, consider a write operation in which the character stream "foo" is output for transmission on a per-character basis. This write operation may result in the generation of three event traces:
write("f");
write("o");
write("o");
To concatenate these three write operations into a single entry, log entry concatenator 116 can parse the contents between the parentheses in these system calls and compare each character between the parentheses to identify the same and different characters in each event trace. In this example, log entry concatenator 116 can identify that the first and last characters are identical and that the middle character differs. Thus, the concatenated parameters for the three event traces may indicate that a single character (i.e., the left quotation mark) is repeated three times, followed by an individual character that differs across the three event traces, and finally followed by an indication that a single character (i.e., the right quotation mark) is repeated three times. Thus, a resulting single entry for the event traces corresponding to the write operation may read as follows:
write(1["], 3[foo], 1["]);

In some embodiments, the single entry generated for a series of consecutive event traces may further indicate that the series of consecutive event traces was replaced by the single entry. A prefix may be prepended to the name of the system call invoked in the series of consecutive event traces indicating that the single entry represents a repetition of a number of system calls. For example, the prefix "_rep_" may be prepended to the name of the system call to indicate that the single entry has replaced a repetition of a number of consecutive system calls. Similarly, a repetition suffix may be appended to the name of the system call invoked in the series of consecutive event traces. By prepending a repetition prefix or appending a repetition suffix, log entry concatenator 116 may preserve information identifying the system call that was repeated in the series of consecutive event traces and explicitly indicate that the single entry represents a repetition of the identified system call.

After log entry concatenator 116 processes the uncompressed log file and generates a modified log file with single entries replacing repetitions of consecutive system calls, the modified log file may be processed by pattern replacer 118 to further compress the log file. Generally, processing a modified log file through pattern replacer 118 may reduce a size of repeated sequences of events including n consecutive event traces referencing the same system call and m other system calls from n+m event traces to 1+m event traces, and substitute records may include changed parameters for a single entry corresponding to the consecutive event traces instead of changed parameters for each of the consecutive event traces. Generally, pattern replacer 118 is configured to identify sequences of event traces indicating that the same system calls were invoked and replace the sequences of event traces with references, or pointers, to an initial matching sequence of event traces.

To identify a sequence of event traces that match a previous sequence of event traces, log entry concatenator 116 can traverse the modified log file using various window sizes to identify repeated sequences of event traces in the modified log file. In some embodiments, the window sizes may begin at a maximum size and progressively decrease in size until the modified log file is processed using a minimum window size. The window size may identify, for example, a number of event traces in the modified log file to analyze to identify repeated sequences of event traces in the modified log file. Generally, pattern replacer 118 may compare a fixed set of event traces against successive windows of event traces to identify sequences of event traces with matching system calls. For example, assume that a window size is set to four event traces. An initial pass through the modified log file may analyze sequences of four event traces against an initial sequence of event traces 1 through 4 in the modified log file. Subsequent passes through the modified log file may analyze sequences of four event traces against a sequence of event traces 2 through 5, 3 through 6, and so on, until the modified log file reaches a predetermined location in the file (e.g., event traces n through n+4).

To identify a matching set of sequences, pattern replacer 118 can use the predefined format of each event trace, as discussed above, to identify the system calls in each event trace in a window of event traces. Pattern replacer 118 may generate lists of system calls extracted from the initial sequence of event traces and subsequent windows of event traces and compare the generated lists. If the generated lists match, pattern replacer 118 can determine that the system calls in the initial sequence and the subsequent sequence of event traces match and can replace the subsequent sequence of event traces with a substitute entry pointing to the initial sequence of event traces. The substitute entry may point, for example, to the first event trace in the initial sequence of event traces by indicating, in a portion of an event trace used to identify a system call, a timestamp of the first event trace in the initial sequence of event traces. The substitute entry may indicate, a number of repetitions of the sequence of event traces, a number of replicated system calls, and information identifying the parameters associated with each replicated system call. The information identifying parameters associated with each replicated system call may be structured, for example, as a list or array having a number of elements corresponding to the number of replicated event traces in the initial and subsequent sequences of event traces.

In some embodiments, while the system calls may be replicated in an initial sequence and a subsequent sequence of event traces, the parameters of these system calls may or may not differ. For records where the parameters of a system call in the initial sequence are identical to the parameters of the same system call in the subsequent sequence, pattern replacer 118 may indicate an exact replication of a system call by including a blank entry in the list of parameters in the substitute entry. Otherwise, pattern replacer 118 may include the parameters from a system call in the subsequent sequence of event traces in the appropriate location in the list of parameters in the substitute entry.

In some embodiments, pattern replacer 118 may further be configured to compress an event log file by removing irrelevant event traces from an event log. For example, an event log may include an event trace identifying that a file was opened and a plurality of event traces indicating that individual characters were read from the file, and an event trace indicating that the file was closed. Because a user may not need information about the contents of the read file to determine whether an application or process is accessing sensitive information (since, presumably, the read file either still exists on resource instance 130 or can be recovered from a backup copy of resource instance 130), the compressed version of the event log need not include the contents of the read file. Thus, pattern replacer 118 may replace a sequence of events including the file open event trace, the plurality of character read event traces, and the file close event trace with a single entry indicating that the sequence of open, character read, and close events has been substituted with a single read file record.

After log file compressor 114 completes record replacement operations on the uncompressed log file, thereby generating the compressed log file, log file compressor 114 may commit the compressed log file to activity log data store 120. In some embodiments, where activity log data store 120 exposes a storage volume on which log files and other files may be stored, log file compressor 114 may write the compressed log file as a plain text file to activity log data store 120. In another embodiment, activity log data store 120 may be a relational or non-relational database. Each event trace in the compressed log file may be committed to activity log data store 120 as an individual entry in the database.

In some embodiments, activity logger 110 can generate a summary of the events captured by the compressed log file. The summary of events may be a further compressed version of the compressed log file that, for example, strips timestamp, process identifier, and elapsed time information from the event traces in the compressed log file. In some embodiments, the summary of events may remove a priori defined system calls from the compressed log file and parameters deemed irrelevant to the generated summary. Further, repeated operations, identified by the substitute entries discussed above, may be reduced into single operations describing the data read or written by a process.

The generated summary may, in some embodiments, be provided to a threat analysis system for analysis. The threat analysis system may generate a threat score from the generated summary identifying a likelihood that the activity captured in the compressed log file is a security threat to computing environment 100. For example, the threat analysis system may use information in the generated summary about the destinations of computing systems that a process writes data to and the sources of computing systems that a process receives data from to determine whether the activity in the compressed log file corresponds to potentially malicious activity. Communications captured in a compressed log file with endpoint devices that are known to be legitimate may result in the captured activity being deemed safe (e.g., having a threat score corresponding to non-malicious activity), while communications with endpoint devices that are known to be malicious (e.g., communications with botnet command-and-control servers, known spam generators, etc.) may result in the captured activity being deemed malicious.

In some embodiments, the generated summary and threat score for event traces included in a compressed log file may be written to the compressed log file. The generated summary and threat score may be written, for example, at the beginning of the compressed log file, which may allow a user analyzing activity captured in the compressed log file to quickly determine whether the activity captured in the compressed log file warrants further analysis.

While FIG. 1 illustrates log file compression using both log entry concatenator 116 and pattern replacer 118, it should be recognized that log file compression may be performed using one or both of log entry concatenator 116 and pattern replacer 118.

Figure 2:
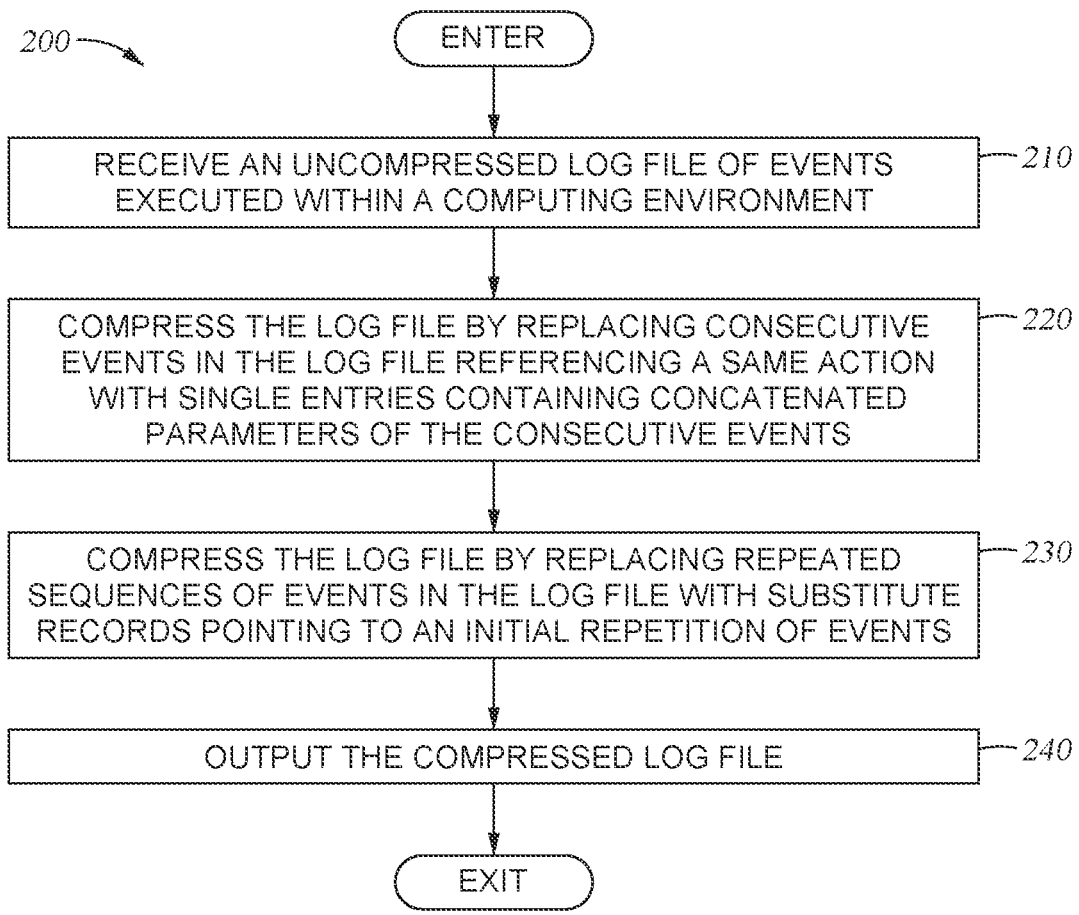
FIG. 2 illustrates example operations for compressing an event log to reduce the size and improve the readability of the event logs, according to one embodiment.

FIG. 2 illustrates example operations 300 that may be performed by an activity logging system (e.g., activity logger 110 illustrated in FIG. 1) to generate a compressed log file from event traces captured from resources executing in a computing environment, according to an embodiment.

As illustrated, operations 200 begin at block 210, where an activity logger receives an uncompressed log file of events executed within a computing environment. The uncompressed log file may include a plurality of event traces, with each event trace corresponding to a system call executed on a resource instance in a computing environment. Each event trace may include information identifying a thread that generated the system call, a timestamp identifying when the system call was performed, an elapsed time value indicating the time needed to execute the system call, a process identifier of the process that spawned the thread, and the system call. The system call may identify a function invoked on a resource instance in the computing environment and parameters of the invoked function. These parameters may include information provided as input into a function or information received as output from the function. In some embodiments, the system call may further include state information indicating whether the system call successfully executed.

At block 220, the system compresses the log file by replacing consecutive events in the log file referencing a same action with single entries containing concatenated parameters of the consecutive events. As discussed, the single entry may include information indicating that the single entry is a replacement for a series of consecutive events that each involved the same system call, and the parameters of each individual system call may be combined into a string in the single entries. In some embodiments, the single entries may include timestamp information corresponding to the timestamp of the first of the consecutive events and may include elapsed time information calculated as a summation of the process durations associated with each of the consecutive events.

At block 230, the system further compresses the log file by replacing repeated sequences of events in the log file with substitute entries pointing to an initial sequence of events. To identify repetitions of an initial sequence of events, the system can analyze an initial sequence of n events against subsequent sequences of n events. If the system calls in the initial sequence match the system calls in a subsequent sequence, the system can determine that the subsequent sequence is a repetition of the initial sequence. The event traces in the subsequent sequence may be replaced in the compressed log file by a pointer to the initial sequence and, if applicable, any differences in parameters between events in the initial and subsequent sequences. In some embodiments, the pointer to the initial sequence may include the timestamp of a first event trace in the initial sequence. The replacement record may include information identifying a number of times the sequence is repeated a number of event traces in the initial and subsequent sequences of event traces.

At block 240, the system outputs the compressed log file. In some embodiments, the compressed log file may be output to a storage volume for storage as a flat file (e.g., a plain text file) and subsequent retrieval from the storage volume. In some embodiments, the compressed log file may be committed to a database or other relational data store in which individual event traces in the compressed log file are stored as individual records in the database.

Figure 3:
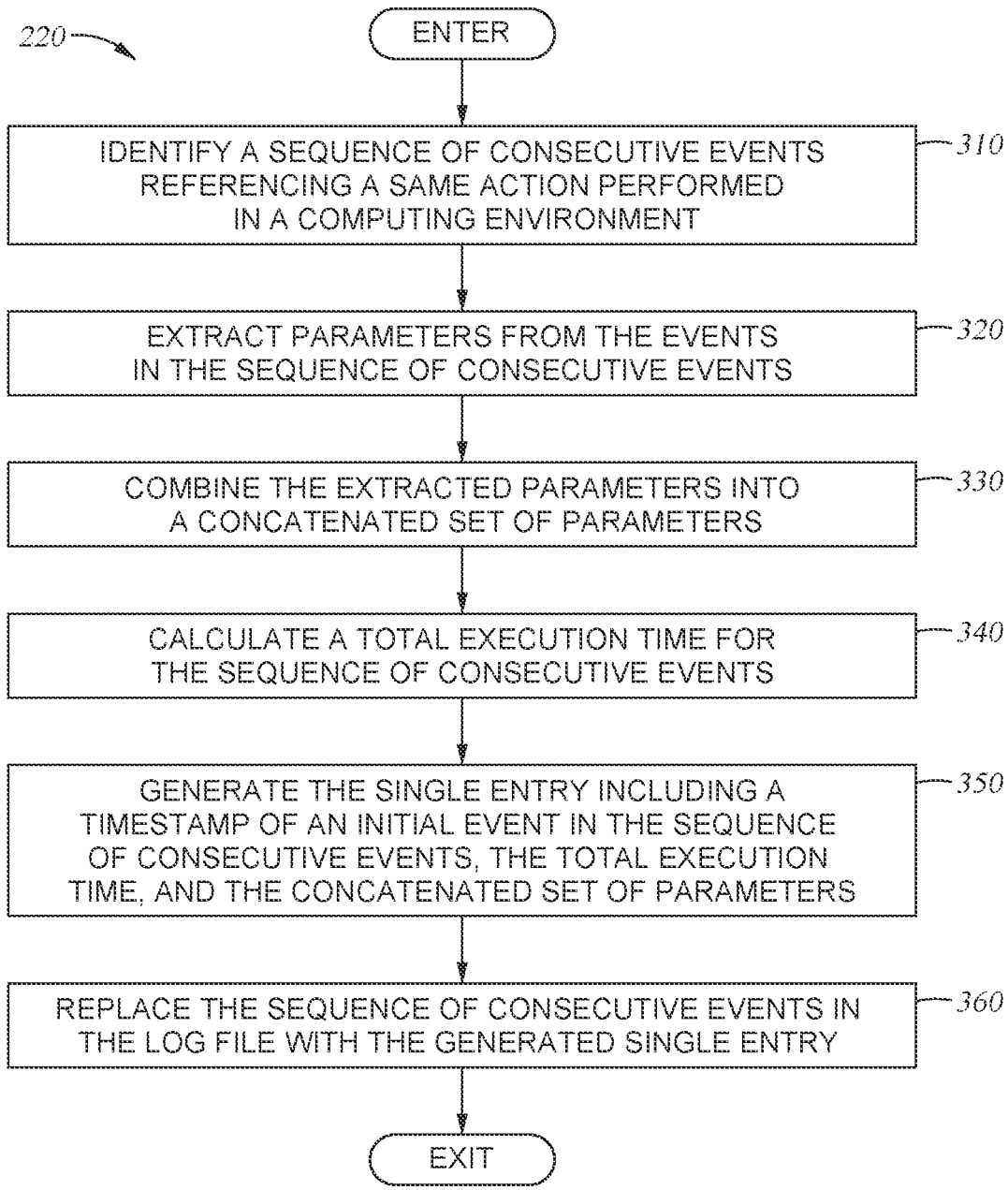
FIG. 3 illustrates example operations for replacing traces of consecutive events referencing a same action in a computing environment with a single entry corresponding to the consecutive events, according to one embodiment.

FIG. 3 illustrates example operations 300 that may be performed by an activity logger (e.g., log entry concatenator 116 of log file compressor 114 illustrated in FIG. 1) to compress a log file by combining event traces of repeated system calls into a single entry, according to an embodiment. Specifically, FIG. 3 illustrates techniques for performing block 220 in method 200.

Operations 300 begin at block 310, where the activity logger identifies a sequence of consecutive events in a log file referencing a same action performed in a computing environment. To identify the sequence of consecutive events, an activity logger may traverse an uncompressed log file to extract system calls from event traces n and n+1 (e.g., different lines in the uncompressed event log) and compare the extracted system calls. If the extracted system calls are a mismatch, the system may proceed to analyze system calls from event traces n+1 and n+2, and so on. If the activity logger determines that the system calls in event traces n and n+1 match, the activity logger can compare the system calls in subsequent event traces until the activity logger determines that the system calls in event traces n and n+m+1 are a mismatch. The resulting sequence of consecutive events may thus be fixed as event traces n through n+m.

At block 320, the activity logger extracts parameters from the events in the sequence of consecutive events. The activity logger can extract these parameters into different arrays corresponding to different parameters in the repeated system call. Extracting parameters into different arrays may result in a set of arrays of size m corresponding to each parameter in the repeated system call.

At block 330, the activity logger combines the extract parameters into a concatenated set of parameters. In some embodiments, where the value of each parameter in a parameter array is identical, the system can reduce the parameter array into a single value of any element in the parameter array. Where the value of each parameter in a parameter array differs (e.g., for read or write operations in which different characters are read from or written to a character stream), a string representing the parameters may be generated by concatenating each value in the parameter array, resulting in a string with characters [0], [1], [2], . . . , [m−1] in that order.

At block 340, the activity logger calculates a total execution time for the sequence of consecutive events. The total execution time may be calculated as a summation of the individual execution times associated with each event in the sequence of consecutive events.

At block 350, the activity logger generates the single entry for the sequence of consecutive events. The single entry may include a timestamp of an initial event in the sequence of consecutive events, the total execution time calculated for the sequence, and the concatenated set of parameters.

At block 360, the activity logger replaces the sequence of consecutive events in the log file with the generated single entry. By replacing sequence of consecutive events with the generated single entry, the activity logger may reduce m event traces into a single, slightly larger record that preserves the information originally stored in the log file in a more readable format. The number of bits consumed in the single entry representing the m consecutive event traces may be reduced to a fraction of the total number of bits consumed by the m consecutive event traces (e.g., an amount greater than 1/m*recordSize bits and significantly less than m*recordSize bits).

FIG. 4 illustrates an example compression of a sequence of consecutive event traces into a single entry, according to an embodiment.

As illustrated, uncompressed consecutive event sequence 410 represents a sequence of write operations that are performed on a resource instance 130 in computing environment 100. Each event trace references the same system call (i.e., the "write" function), though with different parameters indicating that different characters are being written out to a stream with each write operation. To compress the uncompressed consecutive event sequence 410 into a single event record 420, a log entry concatenator 116 in log file compressor 114 may examine each of the event traces in uncompressed consecutive event sequence to identify the parameters in each event trace. For segments in the parameters of a system call having identical characters across each event trace in the sequence, log entry concatenator 116 can write, to a parameter string, information identifying the number of identical characters and the stream of identical characters replicated in each write operation. For segments in the parameters of a system call having different characters, log entry concatenator 116 can amalgamate these segments into a string identifying a number of entries and each character (or characters) included in each event trace.

For example, as illustrated, the write operations in each event trace in uncompressed consecutive event sequence 410 includes the same initial four characters (1, "). The concatenation of parameters from the sequence of event traces may thus begin with "4[1, "]", indicating that four characters are repeated and identifying the repeated characters within the square brackets. The character between quotation marks in the each of the event traces in the uncompressed consecutive event sequence 410, however, may differ. To represent the characters in these event traces, log entry concatenator 116 may write, to the concatenation of parameters, an initial value identifying the number of event traces and information about the parameters in each of the event traces that differ. In this example, the first seventeen event traces involve a single character, and the concatenation of parameters may thus indicate that seventeen individual characters are written (i.e., the characters "buf: BUILD GAYGFT"). The last two event traces involve two characters, "\n", and may be represented as such in the concatenation of parameters. Finally, each event in the sequence ends with the same four characters, and the concatenation of parameters may thus reflect that each discrete write operation ends with the same four characters (", 1").

Single event entry 420 may include the thread identifier, timestamp, and process identifier from the first event trace in uncompressed consecutive event sequence 410. Single event entry 420 may further include the total execution time of the events in the uncompressed consecutive event sequence 410. The system call may be modified in the single event entry 420 to indicate that the single event entry 420 represents a repetition of operations (i.e., in this example, a repetition of write operations) performed on a resource instance in a computing environment and may include, as parameters of the system call, the concatenation of parameters discussed above.

Figure 5:
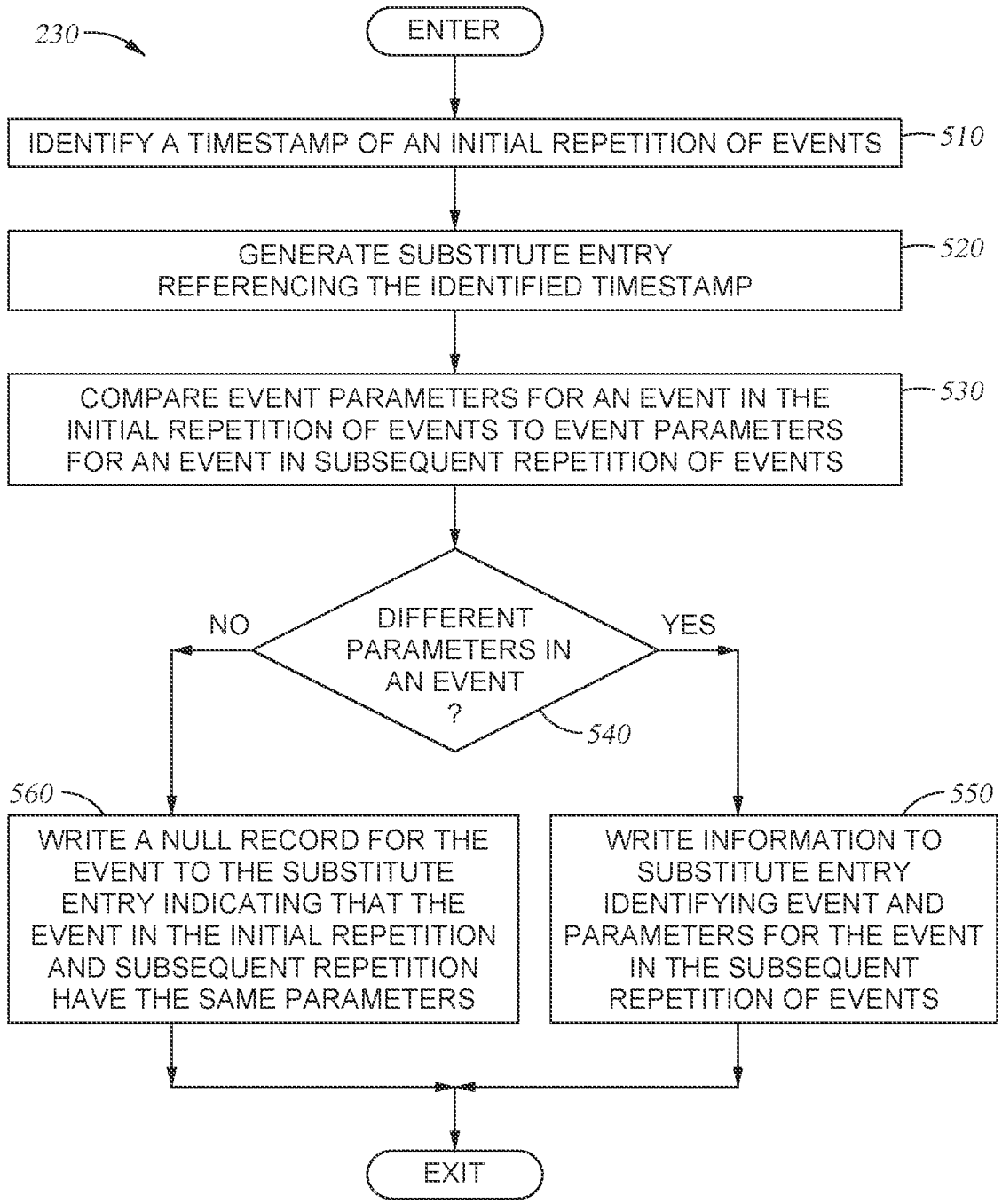
FIG. 5 illustrates example operations for replacing records of sequences of identical events with substitute records, according to one embodiment.

FIG. 5 illustrates example operations 500 that may be performed by an activity logger (e.g., pattern replacer 118 of log file compressor 114 in FIG. 1) to write substitute entries in a log file for repeated sequences of different events, according to an embodiment. Specifically, FIG. 3 illustrates techniques for performing block 230 in method 200, which may be performed subsequent to performing block 220 in method 200 to reduce a number of event traces included in a log file by replacing consecutive events invoking the same function with a single entry in the log file. By writing substitute entries in a log file for repeated sequences of different events subsequent to replacing consecutive events invoking the same function with a single entry in the log file, the substitute entries for a repeated sequence of different events may reference a smaller number of event traces than would be referenced by a substitute entry for raw events in an uncompressed log file.

As illustrated, operations 500 begin at block 510, where the activity logger identifies a timestamp of an initial repetition of events. As discussed, the timestamp of the initial repetition of events may correspond to the timestamp of the first event in the initial repetition.

At block 520, the activity logger generates a substitute entry for a subsequent repetition of events referencing the identified timestamp. The substitute entry may include the thread identifier, timestamp, and process identifier of the first event in the subsequent repetition of events. The system call identified in the substitute entry may include an indication that the substitute entry is a substitute for a sequence of events (e.g., a "_sub_" prefix or "_sub" suffix) and the identified timestamp of the initial repetition.

At block 530, the activity logger compares event parameters for an event in the initial repetition of events to event parameters for a respective event in the subsequent repetition of events. In some embodiments, for a given event, the activity logger can perform a per-character comparison of parameters in for the event in the initial and subsequent repetitions and accumulate a difference counter when characters for a parameter differ between the event in the initial and subsequent repetitions.

At block 540, the activity logger determines whether different parameters are present for the event in the initial and subsequent repetitions. The activity logger may determine whether different parameters are present, for example, by examining the difference counter calculated at block 530. If the difference counter is a non-zero value, the activity logger can determine that the event in the initial repetition has different parameters from the respective event in the subsequent repetition, and operations 500 may proceed to block 550. At block 550, the activity logger writes information to the substitute entry identifying the event and parameters for the event in the subsequent repetition. The identification of the event may be a position in a list corresponding to the event in the initial and subsequent repetitions. For example, in a repetition of four events, 1 through 4, assume that the second event has different parameters in the initial and subsequent repetitions. The list of parameters in the substitute entry may thus include, at position 2 of the list, the parameters for the event in the subsequent repetition.

If, however, at block 540, the activity logger determines that the same parameters are present for the event in the initial and subsequent repetitions, operations 500 may proceed to block 560. At block 560, the activity logger writes a null value for the event to the substitute entry. The null value for the event indicates that that the event in the initial and subsequent repetition has the same parameters.

FIG. 6 illustrates an example replacement of a repeated sequence of events in a log file with a substitute entry, according to an embodiment.

As illustrated, repeated event sequence 610 includes a first set of event traces and a second set of event traces. The first and second sets of event traces share the "_rep_write", "send", and "select" system calls (or repetitions of system calls) and are separated by a "_rep_recv" repetition of system calls. Using a window size of 3, pattern replacer 118 can determine that the first three event traces and the last three event traces in repeated event sequence invoke the same system calls and may generate a compressed sequence 620 including a substitute entry for the last three event traces (i.e., the second set of event traces" in repeated event sequence 610.

To create the replacement record, pattern replacer 118 generates a record including the timestamp and process identifier of the first event trace in the second set of event traces and an execution time corresponding to the sum of execution times associated with the event traces in the second set. The system call in the replacement record may indicate that the replacement record is a substitute for a set of event traces (e.g., through the "_sub_" prefix) and may identify the first record of the initial repetition of event traces. The replacement record may also include a count back to the first event in the initial repetition, a number of repeated system calls, and a list of parameters, where each entry in the list corresponds to parameters for one of the repeated system calls. Where a null value exists in the list, pattern replacer 118 has determined that the parameters are identical for an event in the initial repetition and the respective event in the subsequent repetition. Non-null values however, indicate that the parameters for an event in the initial repetition should be replace by parameters corresponding to the respective event in the list.

Figure 7:
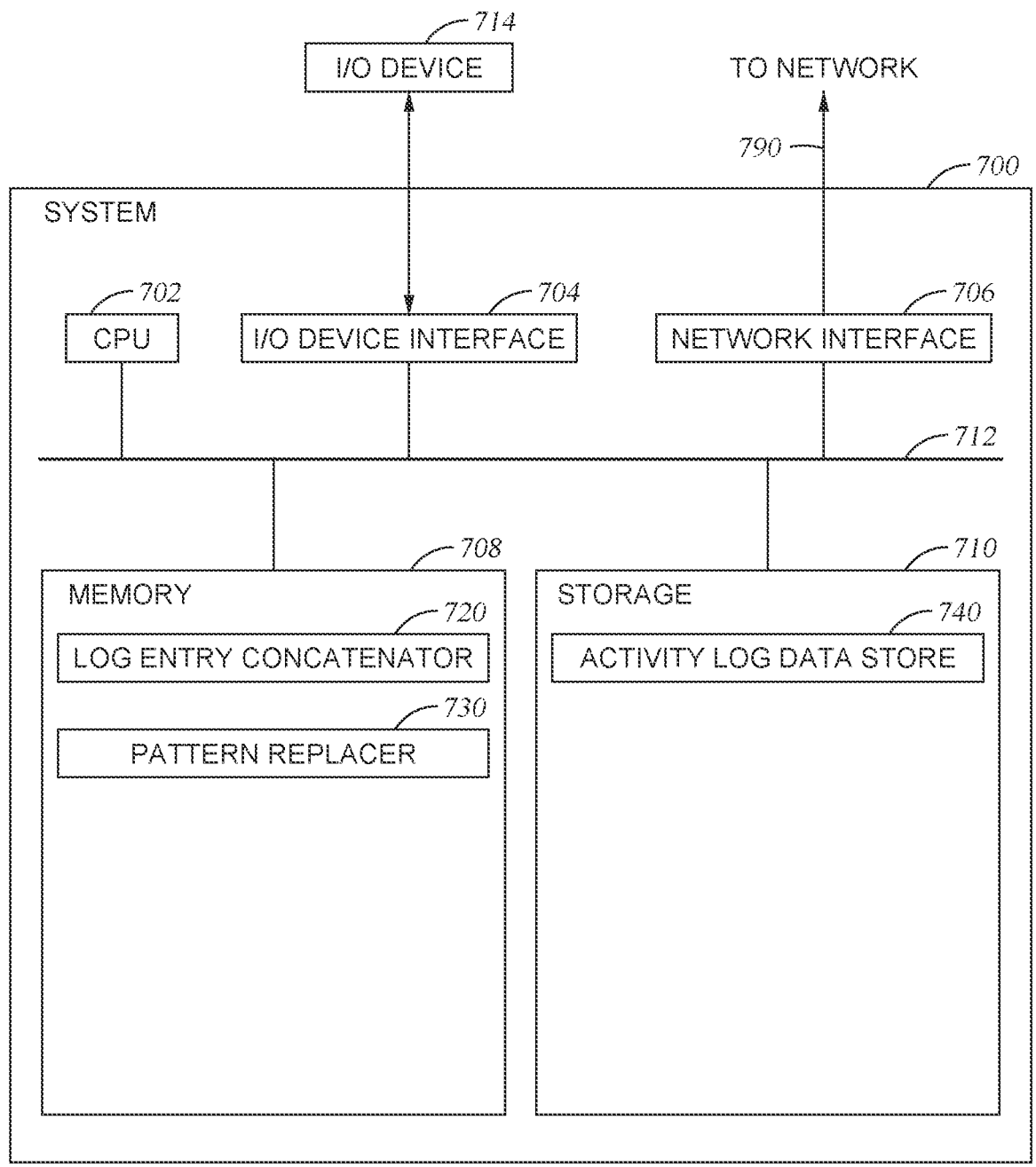
FIG. 7 illustrates an example computing system in which aspects of the present disclosure may be performed.

FIG. 7 illustrates an example system for resolving addresses of resource instances in a computing environment based on historical and current ownership information to prevent applications executing on client devices from communicating with potentially compromised resource instances, according to embodiments of the present disclosure.

As shown, system 700 includes a central processing unit (CPU) 702, one or more I/O device interfaces 704 that may allow for the connection of various I/O devices 714 (e.g., keyboards, displays, mouse devices, pen input, etc.) to the system 700, network interface 706, a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710. CPU 702 is included to be representative of a single CPU, multiple CPUs, a single CPU having multiple processing cores, and the like. Additionally, the memory 708 is included to be representative of a random access memory. Furthermore, the storage 710 may be a disk drive, solid state drive, or a collection of storage devices distributed across multiple storage systems. Although shown as a single unit, the storage 710 may be a combination of fixed and/or removable storage devices, such as fixed disc drives, removable memory cards or optical storage, network attached storage (NAS), or a storage area-network (SAN).

As shown, memory 708 generally includes a record concatenator 720 and a pattern detector 730. Record concatenator 720 is generally configured to identify sequences of event traces in a log file referencing the same system call. For these sequences, record concatenator 720 consolidates the event traces into single entries including a concatenation of the parameters in each of the event traces in a sequence. Pattern detector 730 examines a log file to identify repeated sequences of system calls performed within a computing environment, relative to an initial sequence of system calls. Repeated sequences may be replaced by substitute entries pointing to the initial sequence of system calls an including parameters from the repeated sequences.

Storage 710 generally comprises a log data store 740. Log data store 740 generally provides a repository in which compressed log files generated by record concatenator 720 and/or pattern detector 730 are stored. The compressed log files may be retrieved by users of system 700 to analyze activity within a computing environment for various purposes, such as debugging or security threat analysis.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an event logger or event log compressor) or related data available in the cloud. For example, the event logger or event log compressor could execute on a computing system in the cloud and generate compressed, readable event logs from raw event log data captured in a computing environment. In such a case, the event logger or event log compressor could obtain raw event log data and compress the raw event log data into a smaller and more readable file and store the compressed event log at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for compressing log files, comprising:
   receiving an uncompressed log file including traces of events executed on a computing system;
   identifying, in the uncompressed log file, consecutive events referencing a system call performed with different parameters;
   compressing the uncompressed log file, thereby generating a compressed log file, by replacing the identified consecutive events in the uncompressed log file with a single entry indicating that the system call has been repeated, the single entry including a concatenation of parameters from the consecutive events referencing the same action;
   identifying repeated sequences of different events in the compressed log file, the repeated sequences of different events including a repeated system call identified by the single entry;
   replacing, in the compressed log file, the repeated sequences of different events with a substitute entry referencing an initial repetition of events and a difference between parameters included in the initial repetition of events and a respective repeated sequence; and
   outputting the compressed log file.

2. The method of claim 1, wherein the single entry including the concatenation of parameters from the consecutive events referencing the same action further comprises a total execution time calculated from execution times logged from each of the consecutive events.

3. The method of claim 1, wherein the concatenation of parameters from the consecutive events referencing the same action comprises information identifying a number of consecutive events concatenated into the single entry, an order in which the consecutive events were executed, and a bit size of parameters for each of the consecutive events.

4. The method of claim 1, wherein a timestamp of the single entry comprises a timestamp of a first event of the consecutive events.

5. The method of claim 1, wherein a system call identified in the single entry includes an event prefix indicating that the single entry corresponds to a repetition of the same action.

6. A method for compressing log files, comprising:
   receiving an uncompressed log file including traces of events executed on a computing system;
   identifying, in the uncompressed log file, consecutive events referencing a system call performed with different parameters;
   organizing events in the uncompressed log file into a plurality of groups based on a thread identifier associated with each event;
   compressing the uncompressed log file, thereby generating a compressed log file, by replacing the identified consecutive events in the uncompressed log file with a single entry indicating that the system call has been repeated, the single entry including a concatenation of parameters from the consecutive events referencing the same action, wherein the compressed log file is also organized into the plurality of groups based on the thread identifier associated with each event; and
   outputting the compressed log file.

7. The method of claim 6, wherein the single entry including the concatenation of parameters from the consecutive events referencing the same action further comprises a total execution time calculated from execution times logged from each of the consecutive events.

8. The method of claim 6, wherein the concatenation of parameters from the consecutive events referencing the same action comprises information identifying a number of consecutive events concatenated into the single entry, an order in which the consecutive events were executed, and a bit size of parameters for each of the consecutive events.

9. The method of claim 6, wherein a timestamp of the single entry comprises a timestamp of a first event of the consecutive events.

10. The method of claim 6, wherein a system call identified in the single entry includes an event prefix indicating that the single entry corresponds to a repetition of the same action.

11. A method for compressing log files, comprising:
    receiving an uncompressed log file including traces of events executed on a computing system;
    identifying, in the uncompressed log file, consecutive events referencing a system call performed with different parameters;
    modifying the uncompressed log file by replacing events corresponding to a read operation and characters read during the read operation with a single event identifying that the read operation was performed against a source file;
    compressing the uncompressed log file, thereby generating a compressed log file, by replacing the identified consecutive events in the uncompressed log file with a single entry indicating that the system call has been repeated, the single entry including a concatenation of parameters from the consecutive events referencing the same action; and
    outputting the compressed log file.

12. The method of claim 11, wherein the single entry including the concatenation of parameters from the consecutive events referencing the same action further comprises a total execution time calculated from execution times logged from each of the consecutive events.

13. The method of claim 11, wherein the concatenation of parameters from the consecutive events referencing the same action comprises information identifying a number of consecutive events concatenated into the single entry, an order in which the consecutive events were executed, and a bit size of parameters for each of the consecutive events.

14. The method of claim 11, wherein a timestamp of the single entry comprises a timestamp of a first event of the consecutive events.

15. The method of claim 11, wherein a system call identified in the single entry includes an event prefix indicating that the single entry corresponds to a repetition of the same action.

16. A method for compressing log files, comprising:

receiving an uncompressed log file including traces of events executed on a computing system;

identifying, in the uncompressed log file, consecutive events referencing a system call performed with different parameters;

compressing the uncompressed log file, thereby generating a compressed log file, by replacing the identified consecutive events in the uncompressed log file with a single entry indicating that the system call has been repeated, the single entry including a concatenation of parameters from the consecutive events referencing the same action;

generating, from the compressed log file, a summary of the events executed on the computing system when the uncompressed log file was generated;

outputting the summary to a threat analysis system;

receiving a threat score indicating a likelihood that the events executed on the computing system correspond to a security threat; and outputting the compressed log file.

17. The method of claim 16, wherein the single entry including the concatenation of parameters from the consecutive events referencing the same action further comprises a total execution time calculated from execution times logged from each of the consecutive events.

18. The method of claim 16, wherein the concatenation of parameters from the consecutive events referencing the same action comprises information identifying a number of consecutive events concatenated into the single entry, an order in which the consecutive events were executed, and a bit size of parameters for each of the consecutive events.

19. The method of claim 16, wherein a timestamp of the single entry comprises a timestamp of a first event of the consecutive events.

20. The method of claim 16, wherein a system call identified in the single entry includes an event prefix indicating that the single entry corresponds to a repetition of the same action.

* * * * *